United States Patent [19]
Powell

[11] 4,363,341
[45] Dec. 14, 1982

[54] PLANT CONTAINER FILLING MACHINE

[76] Inventor: Calvin F. Powell, 100 N. H St., Oxnard, Calif. 93030

[21] Appl. No.: 226,799

[22] Filed: Jan. 21, 1981

[51] Int. Cl.³ .............................................. B65B 3/04
[52] U.S. Cl. ...................................... 141/78; 141/183; 198/533; 198/631; 222/201; 222/281
[58] Field of Search ................ 198/533, 631; 222/201, 222/280, 281; 141/129, 71-80, 130-191

[56] References Cited

U.S. PATENT DOCUMENTS

| | | | |
|---|---|---|---|
| 664,477 | 12/1900 | Holtzclaw | 222/201 |
| 1,032,132 | 7/1912 | Gormley | 222/281 |
| 1,743,541 | 1/1930 | Gripp | 222/201 |
| 4,148,389 | 4/1979 | Dixon | 198/631 |

FOREIGN PATENT DOCUMENTS

| | | | |
|---|---|---|---|
| 43447 | 8/1910 | Austria | 222/281 |
| 110064 | 10/1917 | United Kingdom | 222/281 |

Primary Examiner—Houston S. Bell, Jr.
Attorney, Agent, or Firm—Kenneth J. Hovet

[57] ABSTRACT

An apparatus for continuously metering soil into moving containers is provided. Two synchronated rotating bladed wheels dispense soil from a hopper into flats of pots moving on a conveyor in a coordinated manner beneath the wheels. The hopper is vibrated by impingement of the wheel blades against the lower portion of the hopper and the containers are agitated by movement of a frame against the conveyor underside.

10 Claims, 8 Drawing Figures

PLANT CONTAINER FILLING MACHINE

BACKGROUND OF THE INVENTION

1. Field of the Invention

The present invention concerns the filling of containers with particulate matter and, more particularly, the continuous metering of predetermined amounts of soil into moving pots.

2. Description of the Prior Art

One or more of the commonly applied criteria for effective machine dirt filling operations, such as speed, efficiency, low maintenance and low capital investment, have been missing in prior art automatic dirt filling machines. For example, U.S. Pat. No. 3,012,370 describes a sequentially operating stop-and-go plant potting apparatus which attempts to accomplish numerous potting operations simultaneously. While one pot is being filled with dirt, another is being seeded and another is being watered. Of course, providing mechanisms for filling individual pots is clearly inefficient and costly and could result in much waste. For example, a seed may be added or water sprinkled into a pot that may not have been initially filled with soil. Further, the equipment and maintenance costs to pot individual containers, even at a rapid speed, would be prohibitive under today's standards.

U.S. Pat. No. 3,337,986 defines a more compact pot filling system operating by rotation of a turret mechanism. In this way, multiple pots can be filled simultaneously and much less extensive mechanisms are required. The primary disadvantage, however, still resides in slowness of operation and lack of production capacity. Only four pots may be filled at one time per rotation of the turret. Although other operations occur simultaneously, this is still highly inefficient and does not allow for the filling of planters or other voluminous containers.

SUMMARY OF THE INVENTION

The present invention provides an effective integrated system for filling containers with particulate materials while minimizing overflow, waste, labor and capital costs. Rotating bladed wheels dispense material from a hopper while causing a vibration therein to inhibit bridging and promote uniform gravity flow. A conveyor continuously moves containers beneath the wheels in timed relation with the rate of dispensation from the wheels.

Uniform filling of the containers is enhanced with an independently operating container vibration mechanism. The vibration mechanism can be custom adapted to achieve effective filling regardless of whatever fill material is being used. Also, the basic system is readily adaptable for enlargement to double capacity and for the addition of seeding, potting and/or watering units.

DESCRIPTION OF PREFERRED EMBODIMENTS

Figure 1:
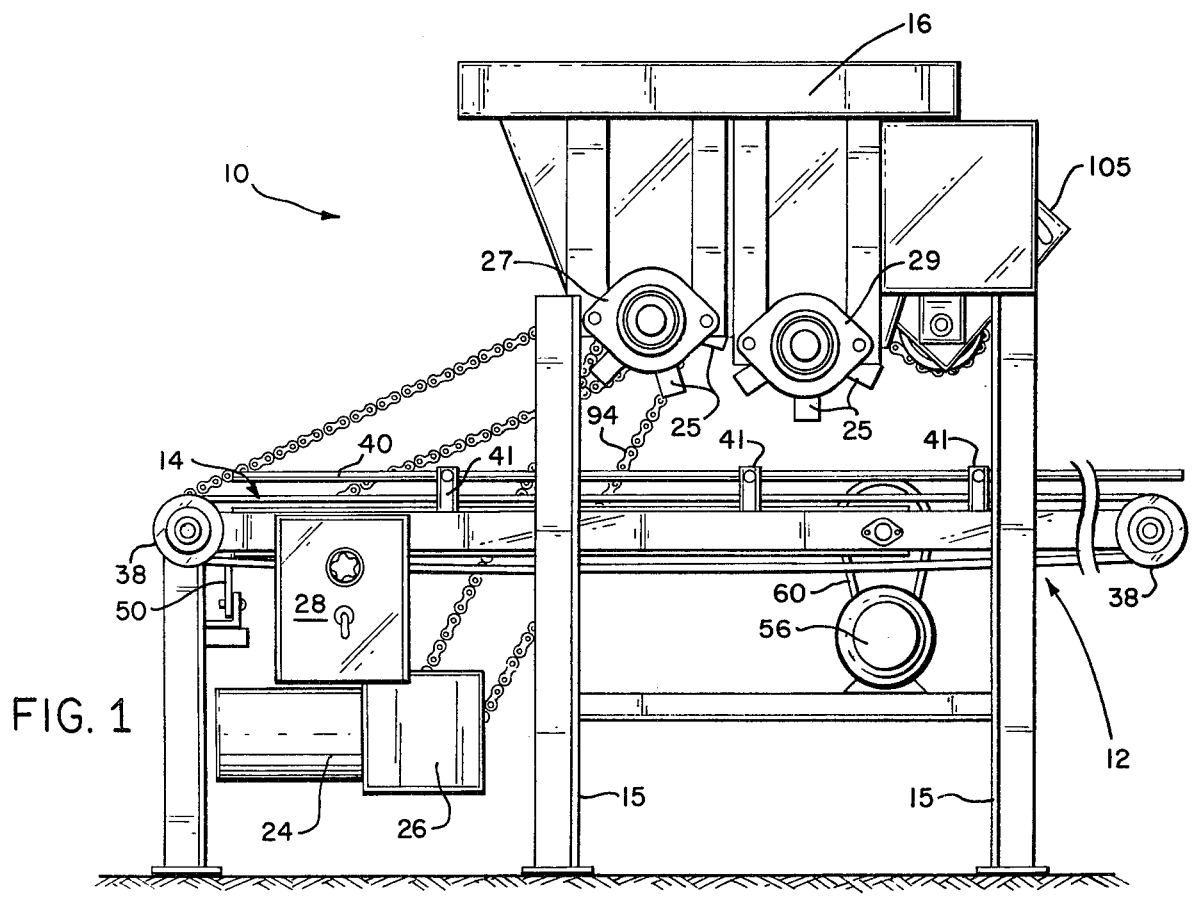
FIG. 1 is a right side elevational view of the present invention.
Figure 2:
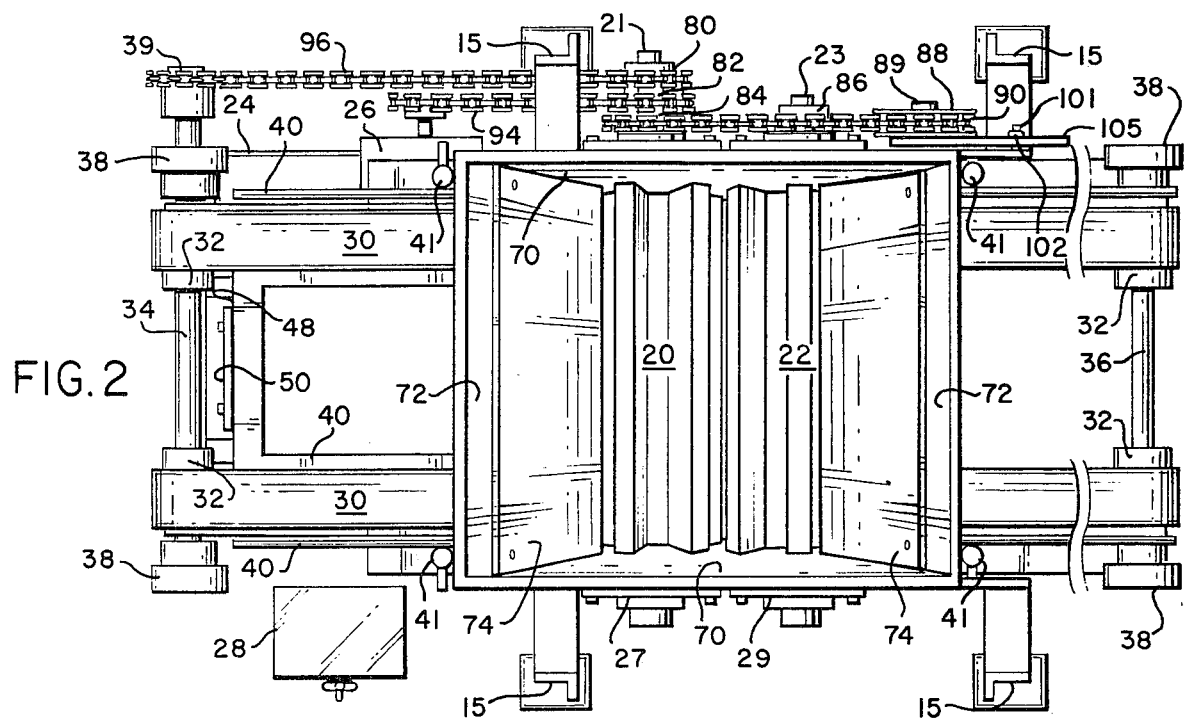
FIG. 2 is a top plan view thereof.

With reference to the drawings, the basic continuously operating dispensing system of the present invention is shown generally in FIG. 1 by reference numeral (10). The system is built around and supported by an overall framework (12). Mounted in a horizontal manner on said framework is conveyor (14). Above the conveyor is feed hopper (16) having a lower outlet (18) which is enclosed by a first rotating wheel (20) and a second rotating wheel (22).

The wheels are rotated in timed relation with movement of the conveyor by a drive means comprising a power source, such as electric motor (24), operating through a variable speed drive mechanism (26) and electrical control box (28). The electric motor, variable speed drive and electric control circuitry each operate in a manner well known in the art to regulate the on/off operation of the system and the speed thereof. The drive means further includes chain and sprocket drive mechanisms arranged in a manner to be hereinafter described for effecting the coordinated movement of the wheels and conveyor.

Conveyor (14) comprises a pair of endless belts (30) mounted on pulleys (32) secured to shafts (34) and (36). The shafts are mounted on the overall framework (12) through bearing members (38). Of course, the conveyor could comprise a singular wide belt rather than the two narrow belts shown. Similarly, the conveyor could also utilize other conveyor transporting devices such as slats mounted on opposing endless chains and the like.

Adjacent the outside of each of the belts (30) are railing members (40). The railing members are connected to the overall framework (12) by upright brackets (41). Such members extend along the length of the conveyor and serve to insure that containers traveling on the conveyor will remain in alignment and not become misdirected.

Figure 6:
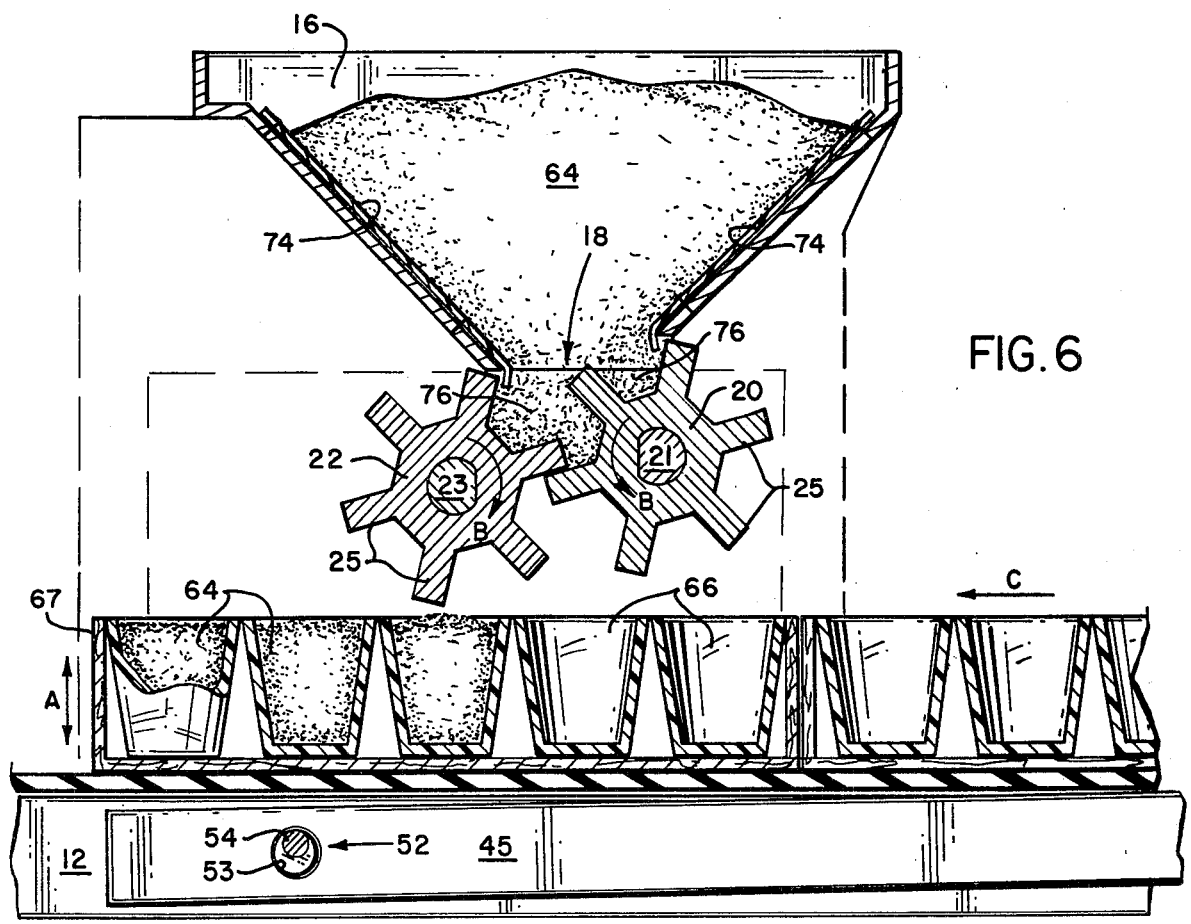
FIG. 6 is an enlarged schematic cross-sectional side view showing the invention in operation with the vibration mechanism of FIG. 4.
Figure 4:
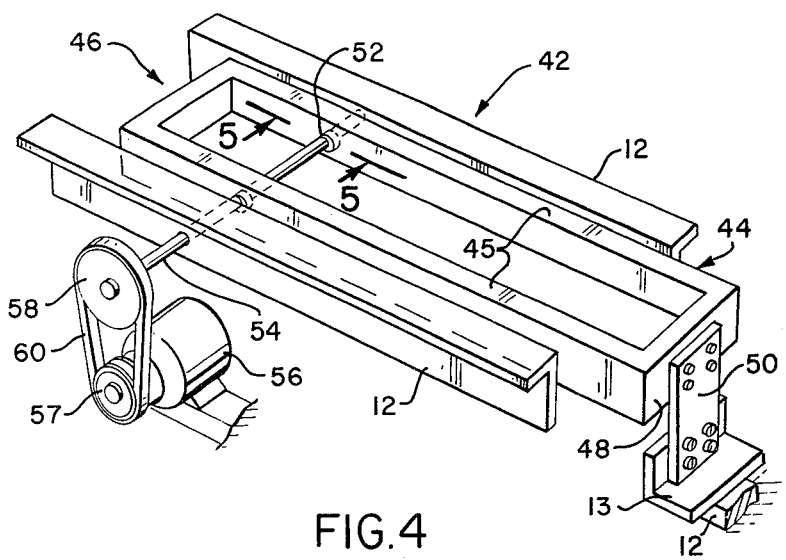
FIG. 4 is a broken-away perspective view of a container vibration mechanism which forms an optional part of the present invention.
Figure 5:
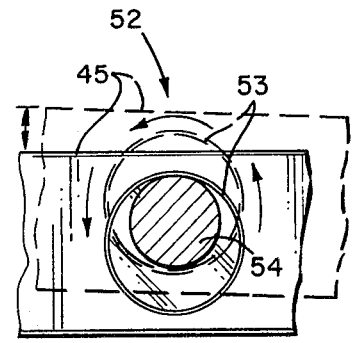
FIG. 5 is an enlarged cross-sectional view taken along lines 5—5 of FIG. 4.

Referring now to FIGS. 4–6, an optional independently operating container vibration mechanism (42) is shown. The mechanism includes a rectangular-shaped frame (44) having a free end (46) and a pivot end (48). The pivot end is constrained by a resilient connector (50) which secures end (48) to bracket (13) of the overall framework (12).

Proximate the free end (46) is an eccentric means comprising a bearing unit (52) which is secured to each of the frame side members (45). A shaft (54) is journaled at opposing ends to framework (12) and extends through the circular bearing member (53) of each bearing unit a predetermined distance off-center. The shaft and bearing members are secured to each other such that rotation of the shaft will cause the vertical reciprocation of free end (46) as shown in FIG. 5.

Rotation of shaft (54) is effected by a power source such as electric motor (56) transmitting rotational force through pulley (57) to pulley (58) mounted on shaft (54) with belt (60) transmitting the rotational force. Of course, the vertical distance of reciprocation can be varied by the distance shaft (54) is positioned off-center in the circular bearing members (53). Also, the speed of reciprocation can be varied by changing the relative diameters of pulleys (57) and (58).

Alternative reciprocation mechanisms may comprise a single bearing unit mounted on a plate secured to the frame in place of the two units (53) shown in FIG. 4. Similarly, an oval-shaped bearing member may be used with shaft (54) extending through its center or an offset shaft could be used within a bearing secured to the frame for creating the desired reciprocation.

With the above-described operation, it can be seen that the free end (46) of the frame (44) will repeatedly impinge upon the respective belts (30) and cause their deflection upward—with gravity and belt tension causing return to a normal position. This action causes vibration of all articles moving on conveyor (14) such as that shown by arrow "A" in FIG. 6 wherein settling of the particulate matter (64) in containers (66) occurs. Such action eliminates air pockets, voids and incomplete filling and can be independently adjusted to the specific fill material and containers being utilized.

Hopper (16) is located directly above conveyor (14) and is supported by upright members (15) of frame (12). The hopper comprises flat vertical sidewalls (70) and inwardly inclined flat end walls (72). The end walls converge toward each other and, with sidewalls (70), form a rectangular-shaped opening (18) at the bottom terminal ends thereof.

At least one of the inclined sidewalls (72) may be provided with a resilient liner such as the sheet-like material (74) shown in FIG. 6. Such liner is shown as being secured to both end walls (72). The liners extend into the outlet (18) beyond the lower ends of said end walls, a distance sufficient to allow contact with the blades (25) of wheels (20 and/or 22).

With the above arrangement, it will be appreciated that as the wheels rotate toward each other in the manner shown by arrows "B," the outer ends of blades (25) will impinge upon the liners (74) and cause a vibration thereof. Such vibration will facilitate free gravity flow of the particulate matter (64) toward the outlet (18) and into the spaces (76) defined as the area between adjacent blades of the rotating wheels.

Of course, the end walls themselves may be constructed of resilient material that extend into opening (18) eliminating the need of separate liners. By utilizing the rotational force of the wheels, a simple effective method for insuring even flow of material through the hopper, without the necessity of expensive ancillary vibrative equipment, is realized.

The rotating wheels (20,22) are secured to shafts (21) and (23), respectively. Each shaft (21,23) is journaled to an opposing bearing member (27,29), respectively. Such bearing members are fixed to the opposing sidewalls (70) of the hopper. The longitudinal axis of the shafts extend at right angles to the direction of movement of the conveyor (14) for an even distribution of material into containers moving thereon.

Each of the wheels (20,22) have an equal number of flat blades (25) which are identical in shape and are spaced about the circumference of each wheel an equal distance. The wheels are horizontally spaced apart a distance sufficient to allow corresponding blades of each wheel to overlap. The wheels are also vertically offset from each other a distance about equal to the thickness of a blade and are synchronized so that the corresponding blades will lie flat against each other. In this manner an effective seal is formed prohibiting flow-through unless the wheels are rotating. This construction also allows for precise metering of particulate matter.

Although the amount of material dispensed can be regulated by the speed of rotation of the wheels, it is apparent that the number of blades, the length of their radial extent and the horizontal spacing apart of the wheels will also dictate volume or amount of material retained in area (76). Clearly, such variables add versatility to the present system and provide a significant advantage over the prior art.

Figure 7:
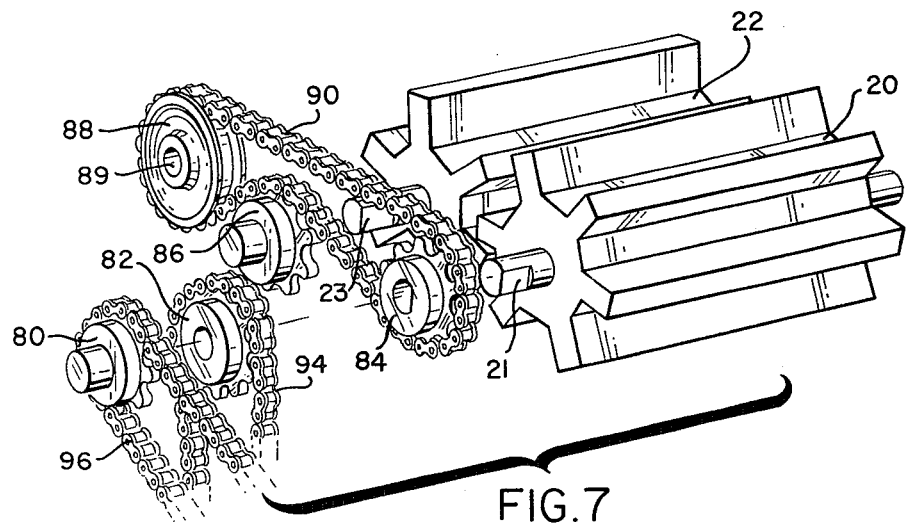
FIG. 7 is a fragmentary exploded perspective view showing a portion of the drive means and rotating wheels of the invention.

Movement of the wheels and conveyor are coordinated through a drive means best illustrated in FIG. 7. In the embodiment shown, such means includes a series of sprockets and chain mechanisms although other known means such as belts and pulleys could be used. Shaft (21) extends a predetermined distance beyond the hopper sidewall (70) and has mounted thereon an outer conveyor sprocket (80), an intermediate power sprocket (82), and an inner drive sprocket (84). Shaft (23) is provided with a second drive sprocket (86) which is connected to the first drive sprocket (84) and an adjustable idler sprocket (88) by chain (90).

Power sprocket (82) is connected to the aforementioned power source (24) and variable speed drive (26) by chain (94). Rotational force is transmitted through said chain to the power sprocket which in turn rotates the conveyor sprocket (80) and drive sprocket (84) thereby causing movement of wheel (22) through the aforesaid chain (90).

Conveyor (14) is connected to the drive means by chain (96). Said chain connects conveyor drive sprocket (39), which is affixed to the extended end of shaft (34), to conveyor sprocket (80). It will be noted that the relative speed of rotation between the wheels (20,22) and longitudinal movement of the conveyor can be varied by changing the relative diameters of the conveyor sprocket (80) and drive sprocket (39) and/or the first drive sprocket (84).

Figure 3:
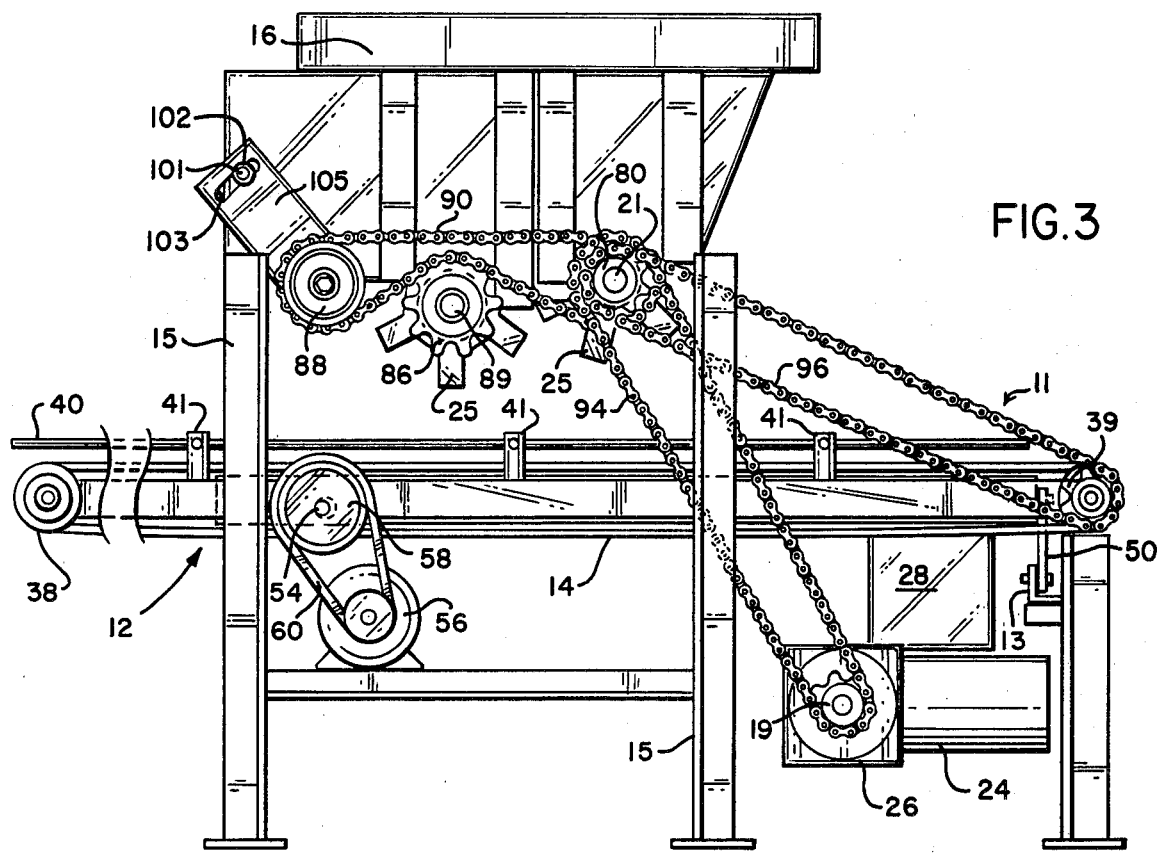
FIG. 3 is a left side elevational view thereof.

As best shown in FIG. 3, the idler sprocket (88) is adjustably connected to the hopper sidewall (70) to maintain tension in chain (90) whenever different-sized sprockets (84) or (86) are used. The idler sprocket rotates about shaft (89) which is secured to bracket (105). The bracket is provided with slot (103) through which extends threaded stud bolt (101). The stud bolt is secured to the outer surface of sidewall (70). Adjustment of chain (90) is effected by loosening nut (102) on bolt (101) and moving the bracket and pulley (88) until the desired tension is achieved. Nut (102) is thereafter re-tightened to maintain the tension.

A typical mode of operation of the invention may be described whereby hopper (16) is filled with particulate matter (64), such as loose potting soil. A tray (67), which is full of containers (66), is located directly beneath the wheels (20,22). Other trays are placed successively on conveyor (14) directly behind the first tray. (In this regard, it is expected that the fore end (11) of the conveyor will be longer than that depicted in the drawings to facilitate placement of numerous successive trays.) The drive means is activated by energizing the circuitry at electric control box (28). Prior to energizing the conveyor and wheels, the optional vibrator mechanism (42) may also be activated by energizing electric motor (56).

Upon activating the conveyor and wheel system, the conveyor and trays will move in the direction shown by arrow "C" in FIG. 6 and the soil particles will commence to be metered into the empty containers moving thereunder in a continuous fashion. The speed of the overall system, of course, can be varied with adjustment of the variable speed drive (24) and/or by changing the relative diameters of the variable-speed drive sprocket (19) and power sprocket (82).

As the trays (67) move under the wheels and the containers are filled to the desired level, the trays may be removed from the conveyor for subsequent handling such as seeding, potting or watering operations. During operation it is preferable to have the trays abut each other as they move beneath the wheels and the system can operate without interruption as long as one keeps the hopper filled with particulate matter and keeps placing trays on the fore end of conveyor (14). Of course, it will be appreciated that the conveyor can be extended any desired length to facilitate convenient removal of successive trays and/or provide for subsequent seeding, potting, watering or other handling operations.

Figure 8:
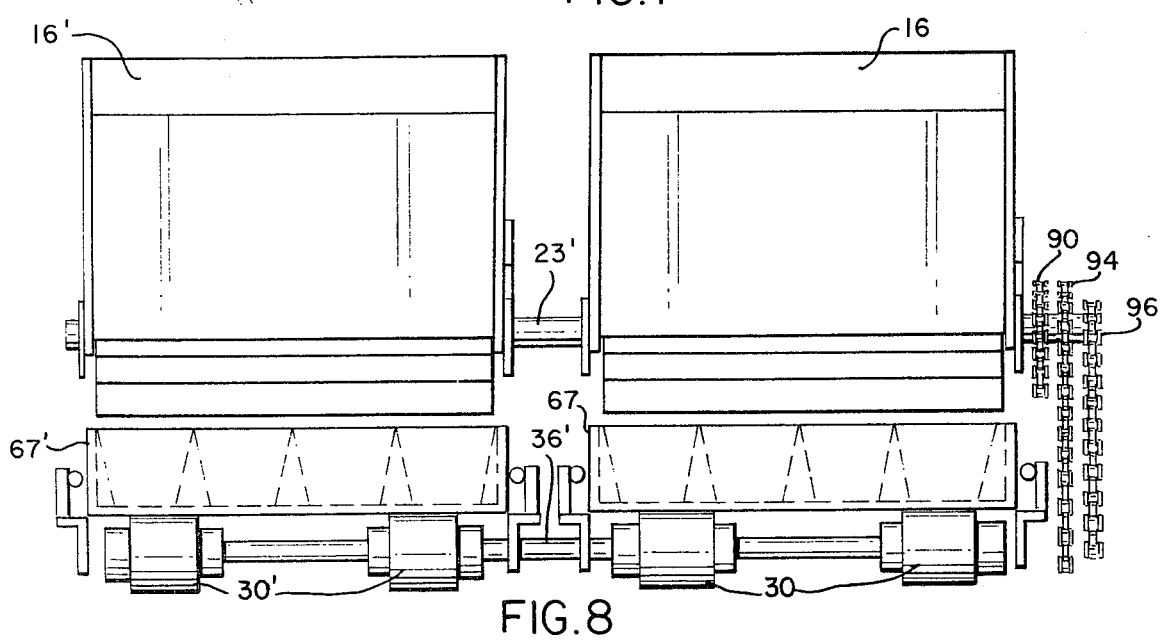
FIG. 8 is an end elevation view of an alternative embodiment of the invention for increasing capacity.

When it is desired to enlarge the dirt filling capacity of the invention, identical basic units of the invention may be placed side by side such as that shown in FIG. 8. Identical hopper (16') is placed above conveyor belts (30') in the same manner as a basic unit. The wheels and conveyor are rotated by common drive shafts (23') and (36'). An identical vibration system (42') (not shown) may also be utilized and, of course, the hopper with the resilient liners may also be utilized in the same manner as described above with reference to liners (74).

From the above descriptions, it is clear that the present invention has significant advantages in that it is a basic highly efficient unit that can be adapted to any manner of operation, whether such relates to horticultural purposes or simply commercial package filling of granular materials or the like. Of special significance is the system's ability to meter predetermined amounts of material and to accomplish such at very high rates.

While the invention has been described with respect to preferred embodiments, it will be apparent that other modifications and improvements may be made without departing from the intents and purposes of the invention. Accordingly, the invention is not to be limited by the specific embodiments, but only by the scope of the appended claims.

I claim:

1. A system for continuously metering predetermined amounts of particulate matter to moving containers comprising
   an overall framework;
   a conveyor mounted on said framework;
   a hopper having an outlet located above said conveyor, said hopper including first and second rotating wheels having radially extending blade members closing said outlet; and,
   drive means connecting said conveyor and wheels to regulate the movement thereof, said wheels being spaced apart from each other a distance sufficient to allow overlap of corresponding blade members on each respective wheel, said hopper including a resilient portion extending into said outlet a distance sufficient to allow contact with at least one of said blades.

2. The system of claim 1 wherein the axial alignments of said wheels are about parallel with one wheel being vertically offset from the other wheel a distance about equal to the thickness of a blade member.

3. The system of claim 1 wherein said first wheel includes a first shaft, said first shaft being journaled to opposing sidewall portions of the hopper wherein one end of said shaft has secured thereto a conveyor sprocket, a power sprocket and a first drive sprocket.

4. The system of claim 3 wherein said second paddle wheel includes a second shaft, said second shaft being journaled to opposing sidewall portions of the hopper wherein one end of said shaft has secured thereto a second drive sprocket which is connected to said first drive sprocket.

5. The system of claim 1 wherein said drive means comprises a power source connected to said power sprocket including a conveyor drive sprocket mounted for rotation on the frame and connected to said conveyor sprocket whereby said power source causes rotation of said power sprocket thereby simultaneously causing rotation of said conveyor sprocket and said first drive sprocket resulting in rotation of said wheels and rotation of said conveyor drive sprocket causing movement of said conveyor.

6. The system of claim 4 including an idler sprocket mounted on said hopper which is connected to said first and second drive sprockets.

7. The system of claim 1 wherein said resilient portion comprises one or more hopper wall portions extending into said outlet a distance that allows one or more blade members to impinge thereon.

8. The system of claim 7 wherein said hopper wall portions comprise an elastic member covering a portion of the interior surfaces of said hopper.

9. The system of claim 1 including means for agitating containers of particulate material on said conveyor comprising a frame located beneath the conveyor and connected to said overall framework at one end with a resilient connector and having a free end connected to said framework by an eccentric means which is supported by a rotatable shaft journaled to said frame whereby rotation of said shaft will cause the angular displacement of said frame against said conveyor or containers.

10. The system of claim 1 wherein each wheel has an equal number of flat blades extending outwardly about parallel with the longitudinal axis of said wheels and are spaced-apart an equal distance about the circumference thereof.

* * * * *